(12) United States Patent
Tokunaga et al.

(10) Patent No.: US 6,245,308 B1
(45) Date of Patent: Jun. 12, 2001

(54) METHOD FOR DECREASING SULFURIC ACID AND SULFURIC ANHYDRIDE PRESENT IN COMBUSTION EXHAUST GAS

(75) Inventors: Kikuo Tokunaga; Yuichi Fujioka; Toshimitsu Ichinose; Toshiaki Ohkubo, all of Nagasaki; Masashi Hishida, Tokyo; Yoshiyuki Wakabayashi; Katsuyuki Ueda, both of Nagasaki, all of (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/282,597

(22) Filed: Mar. 31, 1999

(30) Foreign Application Priority Data

Apr. 8, 1998 (JP) .................................. 10-096242

(51) Int. Cl.$^7$ .................................................. B01D 53/48
(52) U.S. Cl. .......................................................... 423/242.1
(58) Field of Search ................................ 423/242.1, 540, 423/539, 521, 519.2

(56) References Cited

U.S. PATENT DOCUMENTS

| | | | |
|---|---|---|---|
| 1,078,937 | * 11/1913 | Messel ................. | 423/242.1 |
| 2,992,065 | * 7/1961 | Feustel et al. ......... | 423/242.1 |
| 3,284,158 | * 11/1966 | Johswich ............... | 423/242.1 |
| 3,837,820 | 9/1974 | Kukin ................... | 44/5 |
| 5,024,171 | 6/1991 | Krigmont et al. ..... | 110/345 |

FOREIGN PATENT DOCUMENTS

| | | | |
|---|---|---|---|
| 76-05179 | * 9/1977 | (FR) ..................... | 423/539 |
| 55-32758 | * 3/1980 | (JP) ...................... | 423/539 |
| 59-90617 | * 5/1984 | (JP) ...................... | 423/242.1 |
| 5-4022 | * 1/1993 | (JP) ...................... | 423/242.1 |

OTHER PUBLICATIONS

European Search Report, European Patent Application EP99610025, 1999.

* cited by examiner

Primary Examiner—Steven P. Griffin
Assistant Examiner—Timothy C Vanoy
(74) Attorney, Agent, or Firm—Myers Bigel Sibley & Sajovec

(57) ABSTRACT

This invention relates to a method for decreasing sulfuric acid and sulfuric anhydride present in combustion exhaust gas which comprises adding an $SO_3$-decreasing agent (hydrogen gas) to combustion exhaust gas and thereby reducing sulfuric acid ($H_2SO_4$) and sulfuric anhydride ($SO_3$) present in the combustion exhaust gas, as well as a combustion exhaust gas flow system therefor. Thus, this invention provides a method for decreasing sulfuric acid and sulfuric anhydride present in combustion gas which can prevent the occurrence of troubles (e.g., low-temperature corrosion and ash deposition) arising from $H_2SO_4$ and $S_3$ contained in combustion gas.

1 Claim, 10 Drawing Sheets

METHOD FOR DECREASING SULFURIC ACID AND SULFURIC ANHYDRIDE PRESENT IN COMBUSTION EXHAUST GAS

FIELD OF THE INVENTION AND RELATED ART STATEMENT

This invention relates to a method for decreasing sulfuric acid ($H_2SO_4$) and sulfuric anhydride (SO3) contained in combustion exhaust gas from combustors (e.g., boilers) using fossil fuels, and to a combustion exhaust gas flow system therefor.

FIG. 6 is a flow diagram showing the flow of combustion exhaust gas in one example of a conventional boiler. In FIG. 6, fuel fed to a burner 2 is burned in a furnace 1. The resulting combustion exhaust gas is passed through a heat exchanger 3 consisting of a reheater, a secondary superheater, and a primary superheater and a fuel economizer installed in a back pass 4, and then conducted through a flue 5, where it is mixed with $NH_3$ supplied by a denitrating $NH_3$ feeder 10 and denitrated with the aid of a denitration catalyst 6. Subsequently, the combustion exhaust gas is subjected to heat exchange in an air preheater 7, dedusted in an electrostatic precipitator or the like, desulfurized in a desulfurizer 8 or the like, and then discharged into the atmosphere through a stack 9. The detailed explanation of the electrostatic precipitator, heat exchanger and other apparatus installed downstream of air preheater 7 is omitted.

When a fossil fuel containing sulfur (S) is burned in such a combustor (e.g., a boiler), the combustion exhaust gas produced in furnace 1 contains, for example, sulfur dioxide ($SO_2$) formed by the combustion of S, sulfuric anhydride ($SO_3$) formed by the oxidation of a portion of the sulfur dioxide, sulfuric acid ($H_2SO_4$) and water vapor ($H_2O$).

In flue 5, air preheater 7, stack 9 and other apparatus installed downstream of the combustor (e.g., boiler), these $SO_3$, $H_2O$ and $H_2SO_4$] tend to condense and deposit, in the form of highly concentrated $H_2SO_4$, on low-temperature parts whose surface temperature is lower than the acid dew-point, and thereby cause troubles such as low-temperature corrosion and ash deposition.

In order to prevent troubles such as low-temperature corrosion and ash deposition, it is an effective measure to reduce the concentrations of $H_2SO_4$ and $SO_3$ in combustion exhaust gas so as to lower the acid dew-point and thereby decrease the amount of $H_2SO_4$ condensed.

As one means therefor, attempts have been made to decrease the amount of $H_2SO_4$ condensed by adding a neutralizer, such as calcium carbonate ($CaCO_3$), slaked lime [$Ca(OH)_2$] or magnesium hydroxide [$Mg(OH)_2$], to combustion exhaust gas within the flue so as to neutralize and remove $H_2SO_4$ and $SO_3$ while they exist in gaseous form, and thereby lower the acid dew-point (see, for example, Japanese Patent Provisional Publication Nos. 9-75661 and 58-36623). However, these attempts have failed to achieve sufficient efficiency of desulfurization reaction and neutralizer utilization because the concentrations of gaseous $H_2SO_4$ and $SO_3$ are low and the efficiency of their contact with a solid neutralizer such as $CaCO_3$ is low. Moreover, problems concerning operation and equipment construction (e.g., those associated with the handling of a neutralizer), problems concerning the treatment of dust [comprising calcium sulfate ($CaSO_4$) or magnesium sulfate ($MgSO_4$)] which is produced as a result of neutralization and may deposit in the equipment, and like problems remain unsolved. In the present situation, this technique has not yet been put to practical use because its overall economic merit has not been established.

Thus, when a solid $SO_3$ neutralizer such as $CaCO_3$ is added to the flue in order to prevent troubles (e.g., low-temperature corrosion and ash deposition) due to the formation of $H_2SO_4$ and $SO_3$ in combustion exhaust gas and the ensuing condensation and deposition of highly concentrated $H_2SO_4$ on low-temperature parts of the flue, heat exchanger, air preheater and other apparatus installed downstream of the boiler, various problems may arise. As described above, they include low efficiency of desulfurization reaction and neutralizer utilization, poor handleability of the $SO_3$ neutralizer, difficulty in the treatment of dust (e.g., $CaSO_4$) formed as a result of neutralization, trouble due to the deposition of dust in the flue, and the like.

OBJECT AND SUMMARY OF THE INVENTION

It is an object of the present invention to provide a method for decreasing sulfuric acid and sulfuric anhydride present in combustion exhaust gas which can solve the above-described problems of the prior art, can prevent the occurrence of troubles (e.g., low-temperature corrosion and ash deposition) arising from $H_2SO_4$ and $SO_3$ contained in combustion gas, and is easy to operate.

In order to accomplish the above object, the present invention provides:

(1) A method for decreasing sulfuric acid and sulfuric anhydride present in combustion exhaust gas which comprises adding an $SO_3$-decreasing agent to combustion exhaust gas and thereby reducing sulfuric acid ($H_2SO_4$) and sulfuric anhydride ($SO_3$) contained in the combustion exhaust gas;

(2) A method for decreasing sulfuric acid and sulfuric anhydride present in combustion exhaust gas as described above in (1) wherein the $SO_3$-decreasing agent is added at one or more positions in a region which lies downstream of a combustor and in which the temperature of the combustion exhaust gas is in the range of 300 to 1,000° C.; and (3) A method for decreasing sulfuric acid and sulfuric anhydride present in combustion exhaust gas as described above in (1) or (2) wherein the $SO_3$-decreasing agent is hydrogen gas.

Moreover, the present invention also provides a combustion exhaust gas flow system which is installed downstream of a combustor, wherein the combustion exhaust gas flow system is equipped with at least one $SO_3$-decreasing agent feeder at a position in a section extending from a heat exchanger just behind the furnace of the combustor to an air preheater.

In the present invention, $H_2SO_4$ and $SO_3$ present in combustion exhaust gas are decreased by adding an $SO_3$-decreasing agent (the term "$SO_3$-decreasing agent" as used herein means an additive for reducing $H_2SO_4$ and $SO_3$) to the combustion exhaust gas and thereby reducing $H_2SO_4$ and $SO_3$ contained in the combustion exhaust gas to form $H_2SO_3$ and $SO_2$.

As the $SO_3$-decreasing agent, hydrogen ($H_2$) gas is especially preferred from the viewpoint-of reactivity and handleability.

The amount of $SO_3$-decreasing agent added may suitably be determined according to the type of the $SO_3$-decreasing agent, the properties of combustion exhaust gas, and the like. However, when $H_2$ gas is used as the $SO_3$-decreasing agent and the combustion exhaust gas comprises ordinary boiler-exhaust gas, it will be sufficient to use $H_2$ gas in such an amount as to give an $H_2$ gas concentration of not greater than 2,000 ppm or a molar $H_2/SO_3$ ratio of not greater than 15.

The $SO_3$-decreasing agent is preferably added at a position in a region which lies downstream of the combustor and in which the temperature of the combustion exhaust gas is in the range of 300 to 1,000° C. The reason for this is that the aforesaid temperature range is favorable for the reduction reaction of $SO_3$ to $SO_2$, the reduction reaction of $H_2SO_4$ to $H_2SO_3$, and the reduction reaction of oxygen (O) adsorbed to the catalytically active sites of deposited ash and responsible for the formation of $SO_3$. Although the $SO_3$-decreasing agent may be added at one position, the reduction reactions can be made to proceed more efficiently by dividing the $SO_3$-decreasing agent into a plurality of portions and adding them at different positions.

In the flow diagram of FIG. 6 showing the flow of combustion exhaust gas in a boiler, a section extending from behind the secondary superheater within heat exchanger 3 to air preheater 7 corresponds to the region where the temperature of the combustion exhaust gas is in the range of about 300 to 1,000° C., and hence serves as a site suitable for the addition of the $SO_3$-decreasing agent.

That is, the $SO_3$-decreasing agent may be added at any one or more positions, such as a position just before air preheater 7, a position just before denitration catalyst 6, back pass 4, and a position between the outlet of furnace 1 and back pass 4.

Sulfur (S) present in combustion gas from a boiler undergoes the following reactions in an oxidizing atmosphere.

$S+O_2 \rightarrow SO_2$ (1,000 to 1,400° C.)      Formula (a)

$SO_2+\frac{1}{2}O_2 \rightarrow SO_3$ (300 to 1,200° C.)      Formula (b)

$SO_3+H_2O \rightarrow H_2SO_4$ (400° C. or below)      Formula (c)

During the combustion of fuel in a boiler, sulfur (S) contained therein is oxidized by the reaction of formula (a), and exists in the combustion exhaust gas predominantly as $SO_2$. When the temperature of the atmosphere is lowered to 400–500° C. in a region downstream of the boiler, the chemical equilibrium of formula (b) is largely shifted to the formation of $SO_3$, so that $SO_3$ is stably formed. When the temperature of the atmosphere is further lowered to 400 or below, the formation of $H_2SO_4$ gas by the reaction of $SO_3$ with $H_2O$ according to formula (c) begins.

When $H_2$ gas is added to and mixed with combustion exhaust gas in such a region where the temperature of the combustion exhaust gas is in the range of 300 to 1,000° C., the $H_2$ gas reacts with $H_2SO_4$ and $SO_3$ present in the exhaust gas according to formulae (d) and (e). Thus, $H_2SO_4$ and $SO_3$ are reduced to $H_2SO_3$ and $SO_2$, respectively, so that the amounts of $H_2SO_4$ and $SO_3$ present in the exhaust gas are decreased. Moreover, owing to the catalytic effect of ash deposited on the heat transfer surfaces, $SO_3$ is formed by the reaction of formula (f). However, the addition of $H_2$ gas serves to reduce oxygen (O) adsorbed to the catalytically active sites of the deposited ash according to formula (g). This lowers the rate of formation of $SO_3$ and, therefore, further enhances the $SO_3$-decreasing effect.

$SO_3+H_2 \rightarrow SO_2+H_2O$ (200 to 1,000° C.)      Formula (d)

$H_2SO_4+H_2 \rightarrow H_2SO_3+H_2O$ (400 or below)      Formula (e)

$SO_2+(O) \rightarrow SO_3+H_2O$ (ash catalyst: 300 to 1,000° C.)      Formula (f)

$H_2+(O) \rightarrow H_2O$ (ash catalyst: 300 to 1,000° C.)      Formula (g)

$H_2+\frac{1}{2}O_2 \rightarrow H_2O$ (higher temperatures)      Formula (h)

Since a large amount of $O_2$ is present in the combustion exhaust gas, there would occur a reaction in which the added $H_2$ is consumed by reaction with $O_2$ according to formula (h). Nevertheless, the reactions of formulae (d) and (e) proceed in the presence of $O_2$, and the reason for this is considered to be as follows: At higher temperatures, the rate of the reaction of formula (h) is high and, therefore, the added $H_2$ will react with $O_2$ at once. However, at 1,000° C. or below, the rate of the reaction of formula (h) is lowered, so that the added $H_2$ competitively undergoes the reactions of formulae (d), (e), (g) and (h). Thus, the reactions of formulae (d), (e) and (g) occur preferentially, because the reactions of formulae (d), (e) and (g) are faster than the reaction of formula (h).

Figure 1:
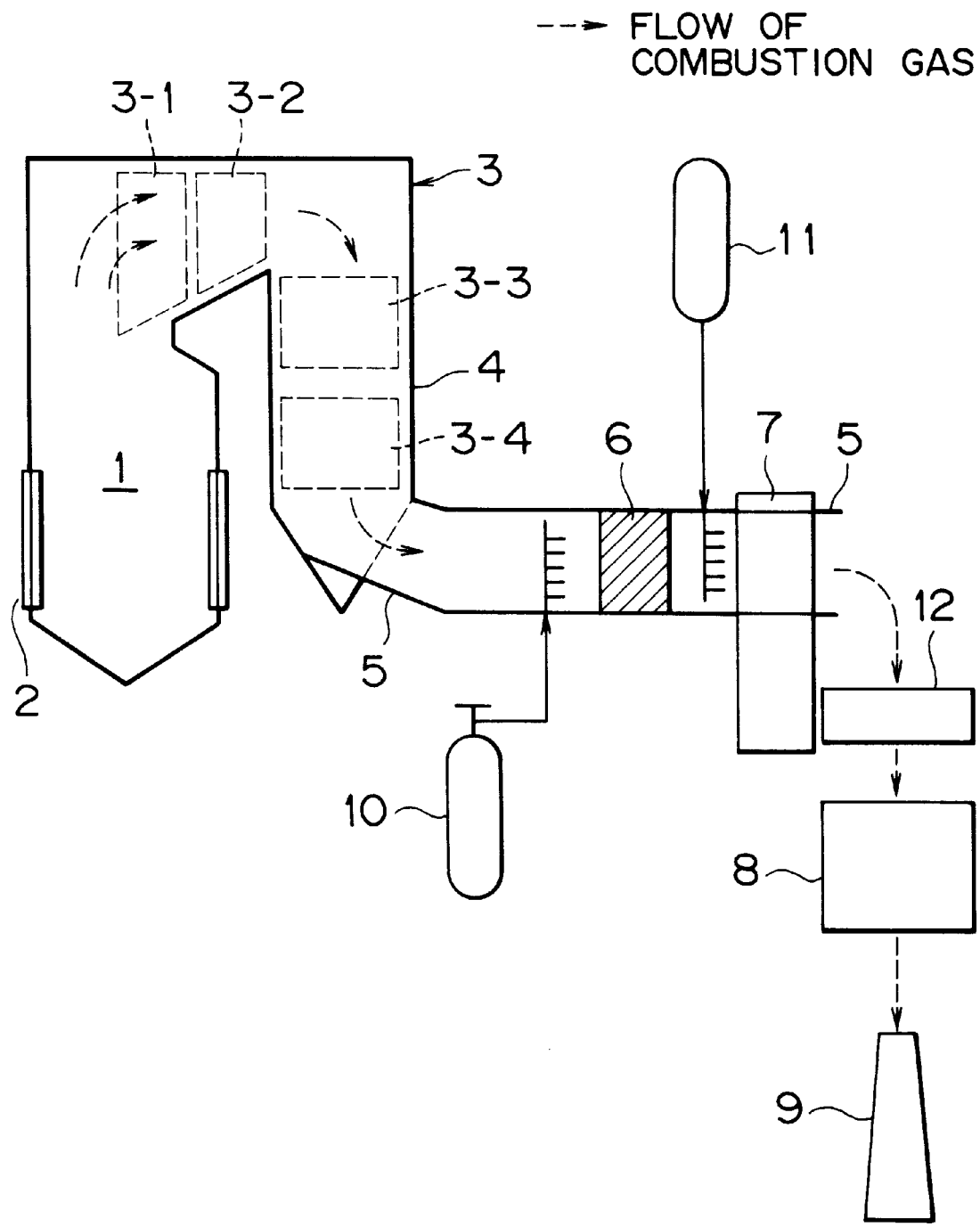
FIG. 1 is a flow diagram showing the flow of combustion exhaust gas in a boiler according to a first embodiment of the present invention.

The reference numerals shown in these figures are defined as follows: 1, furnace; 2, burner; 3, heat exchanger; 3-1, reheater; 3-2, secondary superheater; 3-3, primary superheater; 3-4, fuel economizer; 4, back pass; 5, flue; 6, denitration catalyst; 7, air preheater; 8, wet desulfurizer (for $SO_2$ absorption); 9, stack; 10, denitrating $NH_3$ feeder; 11, $SO_3$-decreasing agent feeder; 11-1, $SO_3$-decreasing agent feeder A; 11-2, $SO_3$-decreasing agent feeder B; 11-3, $SO_3$-decreasing agent feeder C; 12, electrostatic precipitator; 21 and 41, temperature controller; 22 and 42, electric furnace; 23 and 43, tubular reactor (quartz glass tube); 24, test gas supply line; 25, humidifier; 26 and 46, thermocouple; 27, test gas line; 28, gas analyzer; 29, gas-absorbing bottle; 30, exhaust gas line; 31, $H_2$ additive gas cylinder; 32, test gas cylinder; 33, 34 and 35, valve; 35, 36 and 53, flowmeter; 37 and 47, test ash; and 38 and 48, half quartz glass tube.

Figure 9:
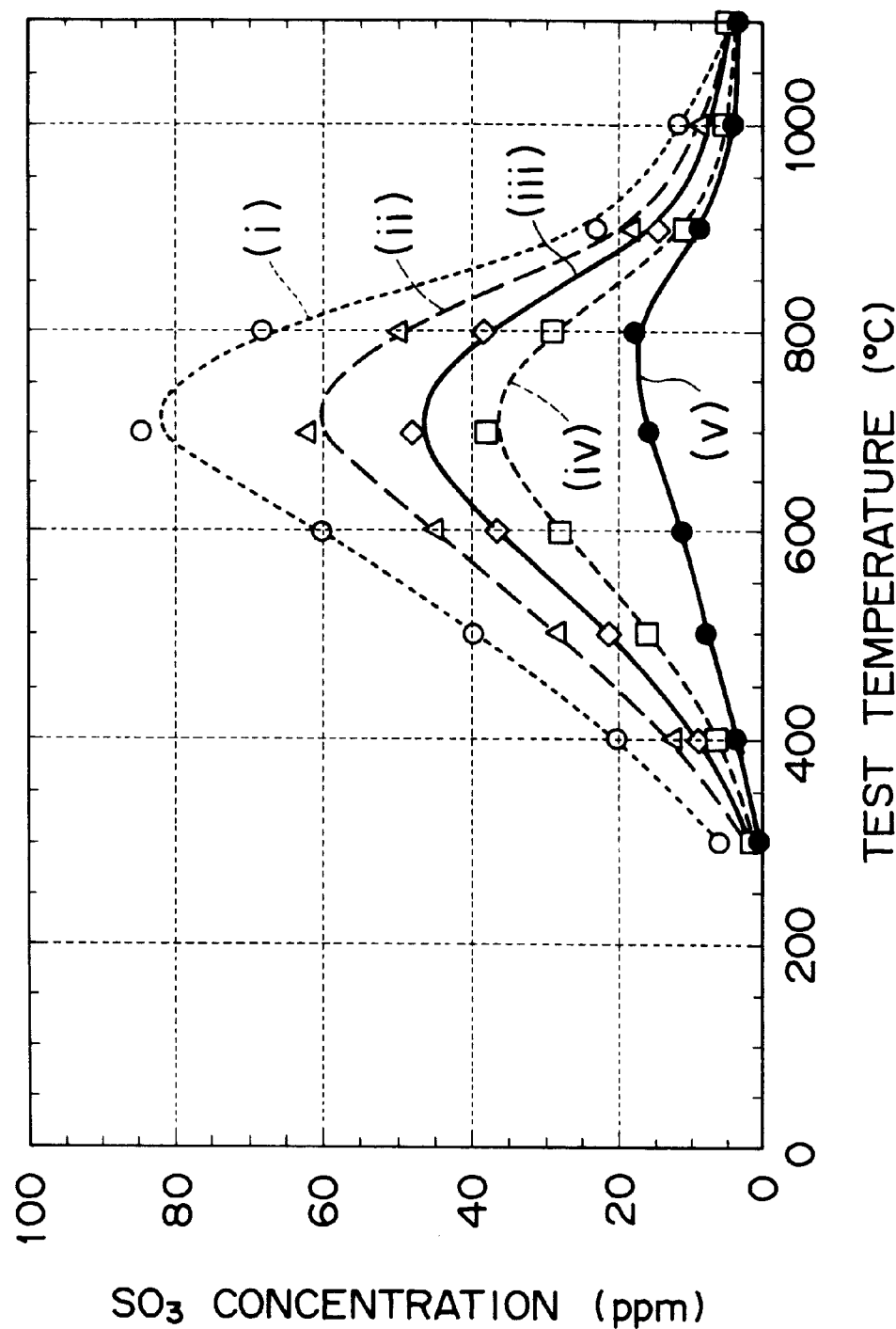
FIG. 9 is a graph showing the relationship between the test temperature and the $SO_3$ concentration produced in a =testing gas when tests were carried out in Example 1 with or without the addition of $H_2$.

In FIG. 9, the testing conditions are as follows: (i) no $H_2$ was added in the presence of a catalyst; (ii) 200 ppm of $H_2$ was added in the presence of a catalyst; (iii) 400 ppm of $H_2$ was added in the presence of a catalyst; (iv) 800 ppm of $H_2$ was added in the presence of a catalyst; and (v) no $H_2$ was added in the absence of catalyst.

Figure 10:
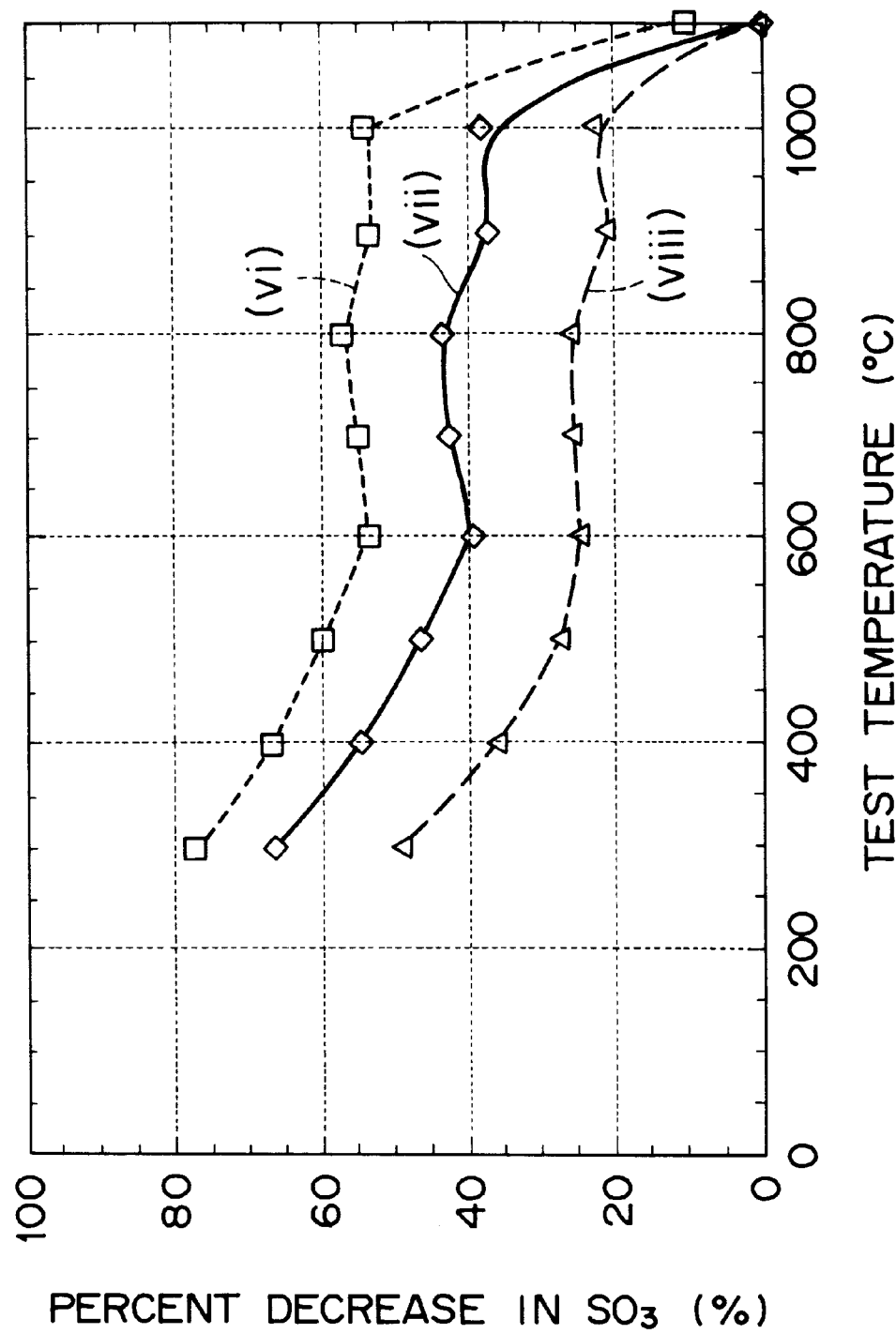
FIG. 10 is a graph showing the relationship between the test temperature and the percent decrease in $SO_3$ caused by the addition of $H_2$ as based on the $SO_3$ concentration produced in Example 1 when no $H_2$ was added in the presence of a catalyst (test ash).

In FIG. 10, the testing conditions are as follows: (vi) 200 ppm of $H_2$ was added; (vii) 400 ppm of $H_2$ was added; and (viii) 800 ppm of $H_2$ was added.

DETAILED DESCRIPTION OF PREFERRED EMBODIMENTS

Several embodiments of the present invention are specifically described hereinbelow with reference to the accompanying drawings.

Figure 6:
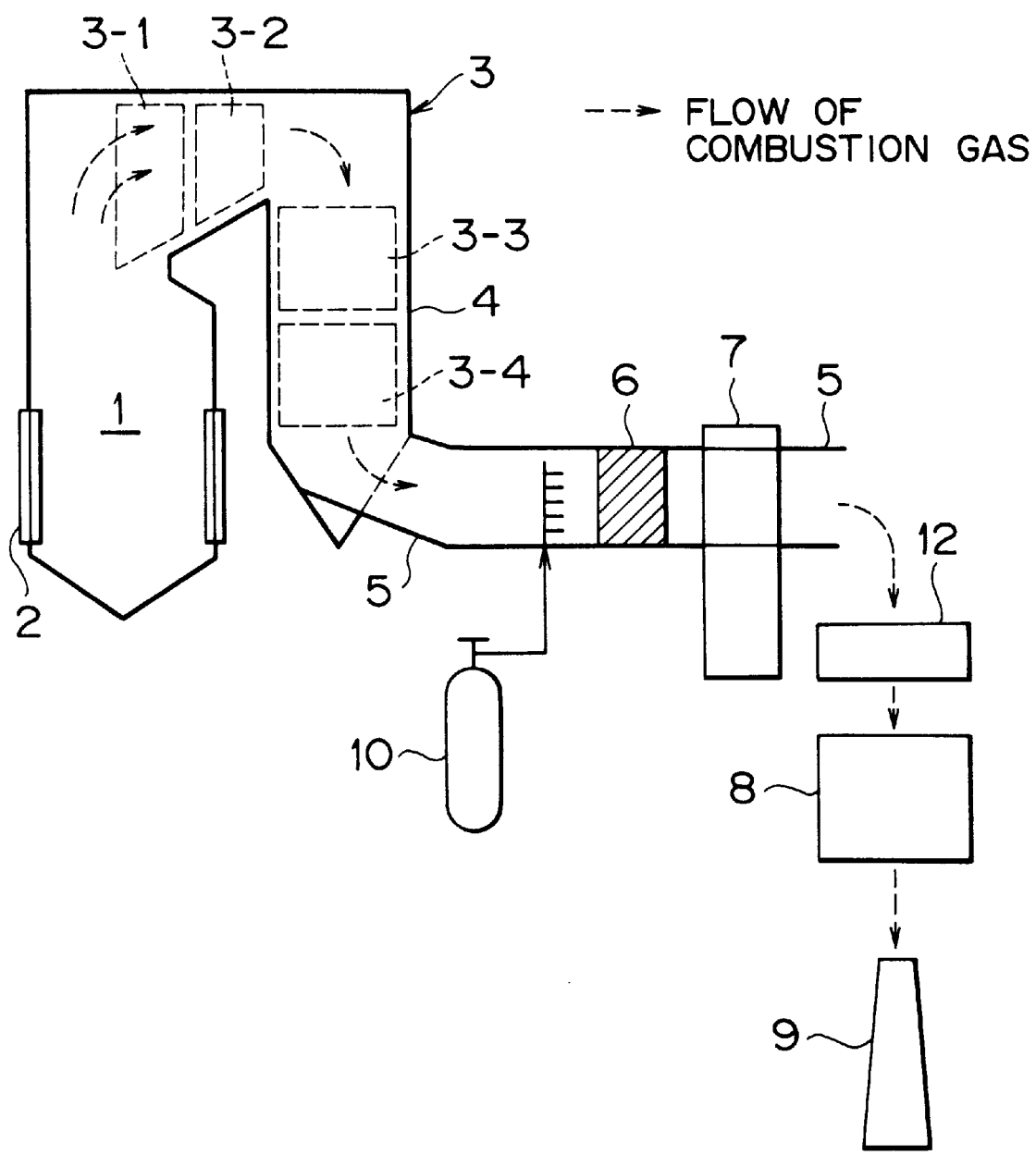
FIG. 6 is a flow diagram showing the flow of combustion exhaust gas in a conventional power-generating boiler using a fossil fuel.

FIG. 1 is a flow diagram showing the flow of combustion exhaust gas in a boiler according to a first embodiment of the present invention. The embodiment of FIG. 1 differs from the conventional system of FIG. 6 in that an $SO_3$-decreasing agent feeder 11 for adding $H_2$ gas as an $H_2SO_3$ and $SO_3$-decreasing agent is installed at a position upstream of air preheater 7 and downstream of nitration catalyst 6, where the concentrations of $H_2SO_3$ and $SO_3$ within flue 5 are increased. The $H_2$ gas, which is added to and mixed with the combustion exhaust gas by means of $SO_3$-decreasing agent feeder 11, reacts with $H_2SO_3$ and $SO_3$ present in the combustion exhaust gas during the period of time in which the temperature of the exhaust gas falls to the outlet temperature of air preheater 7, so that the concentrations of $H_2SO_3$ and $SO_3$ are reduced.

Figure 2:
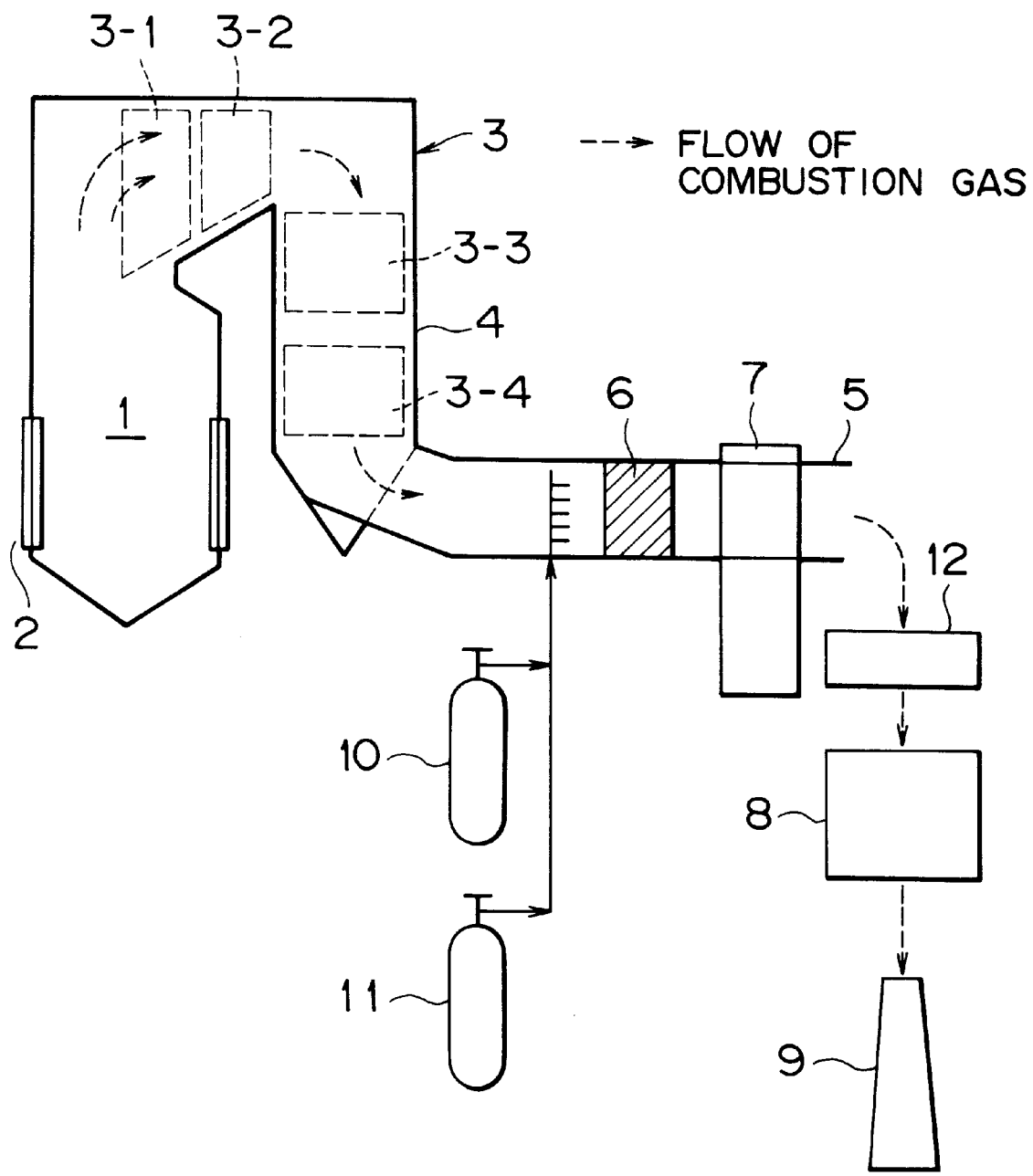
FIG. 2 is a flow diagram showing the flow of combustion exhaust gas in a boiler according to a second embodiment of the present invention.
Figure 3:
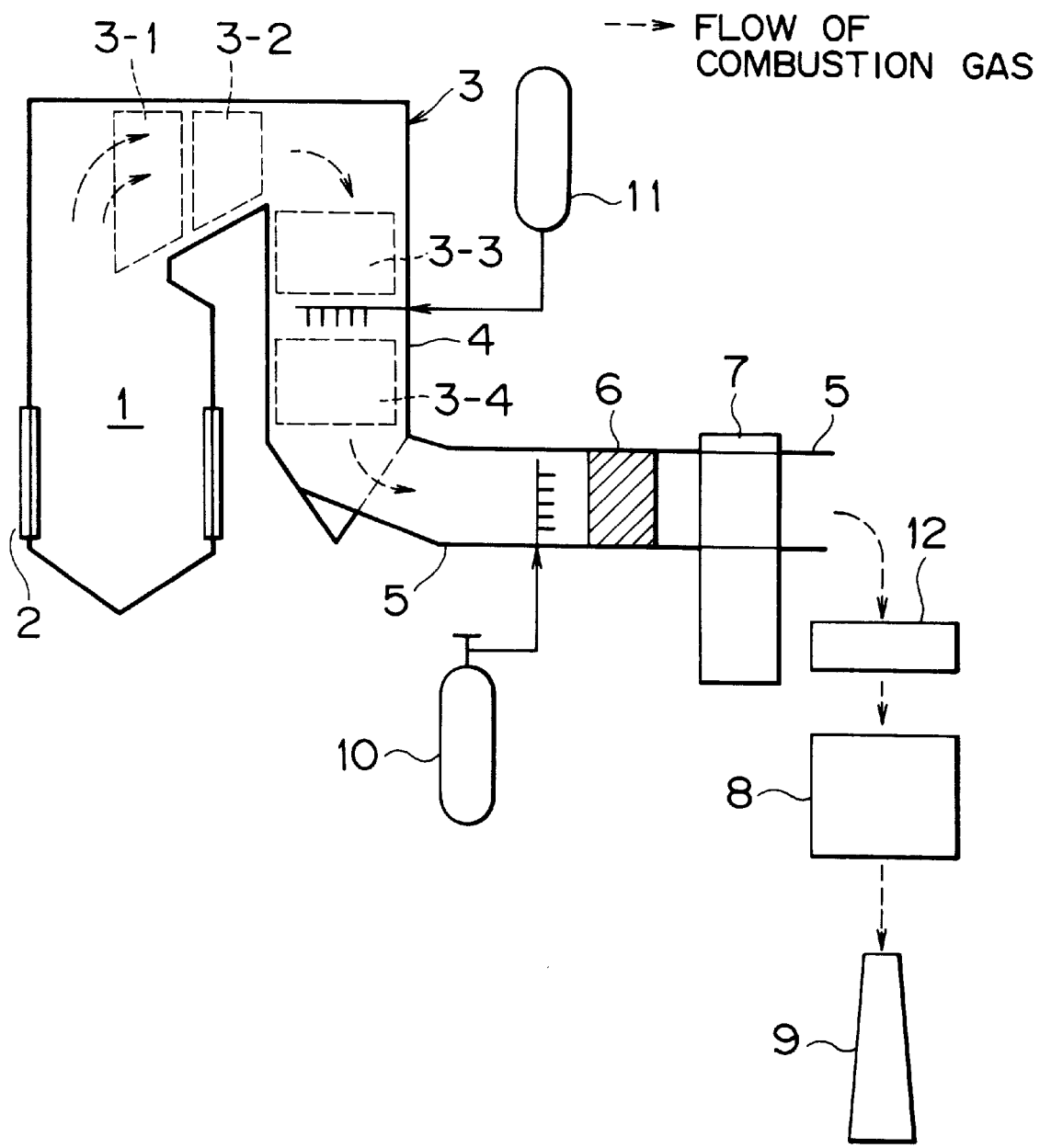
FIG. 3 is a flow diagram showing the flow of combustion exhaust gas in a boiler according to a third embodiment of the present invention.
Figure 4:
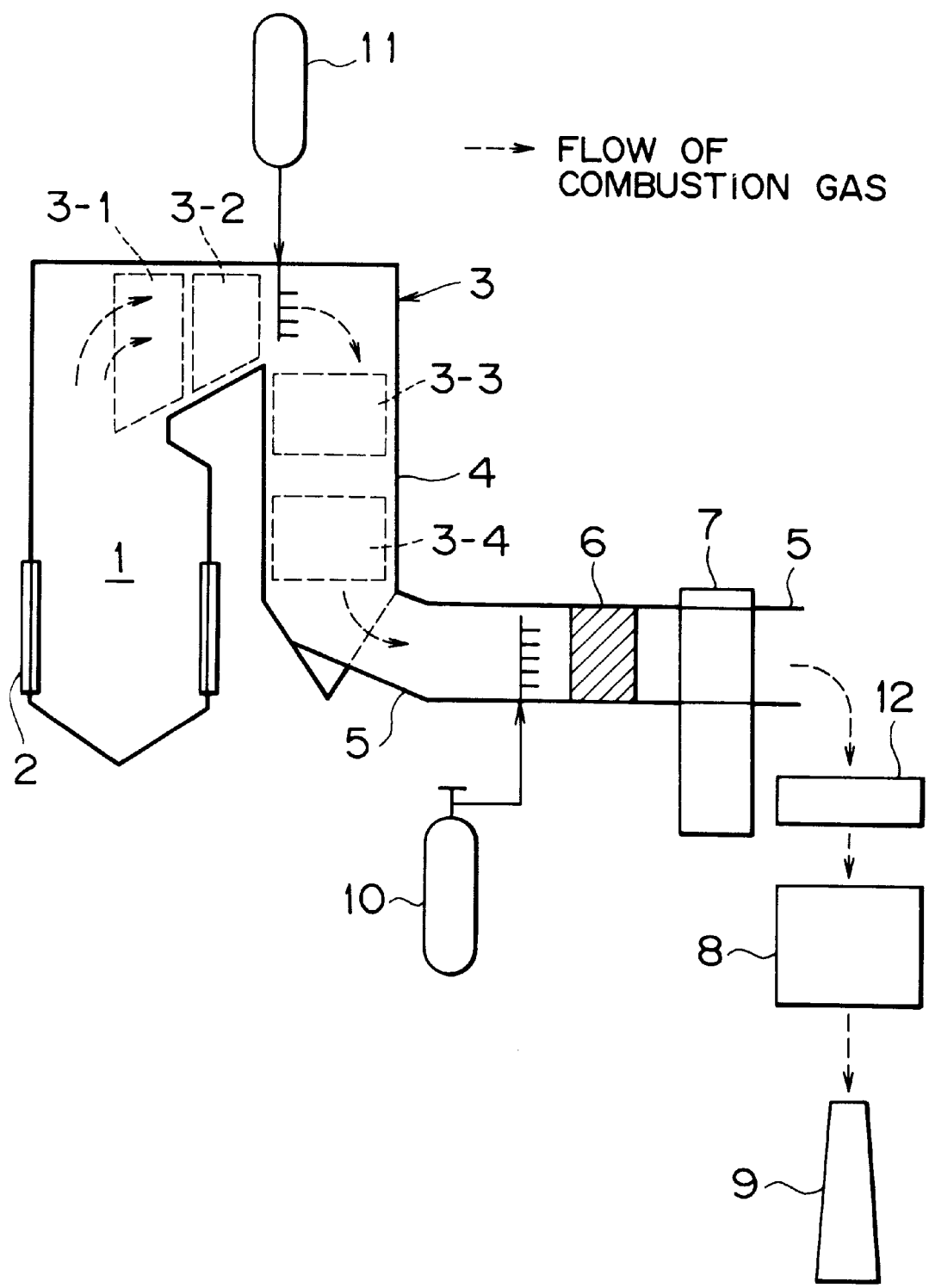
FIG. 4 is a flow diagram showing the flow of combustion exhaust gas in a boiler according to a fourth embodiment of the present invention.

FIGS. 2, 3 and 4 are flow diagrams showing the flow of combustion exhaust gas in a boiler according to second, third and fourth embodiment of the present invention, respectively. In these embodiments, an $SO_3$-decreasing agent feeder 11 is installed at a position within flue 5 just before nitration catalyst 6, a position within back pass 4, and a position between the outlet of furnace 1 and back pass 4, respectively.

Figure 5:
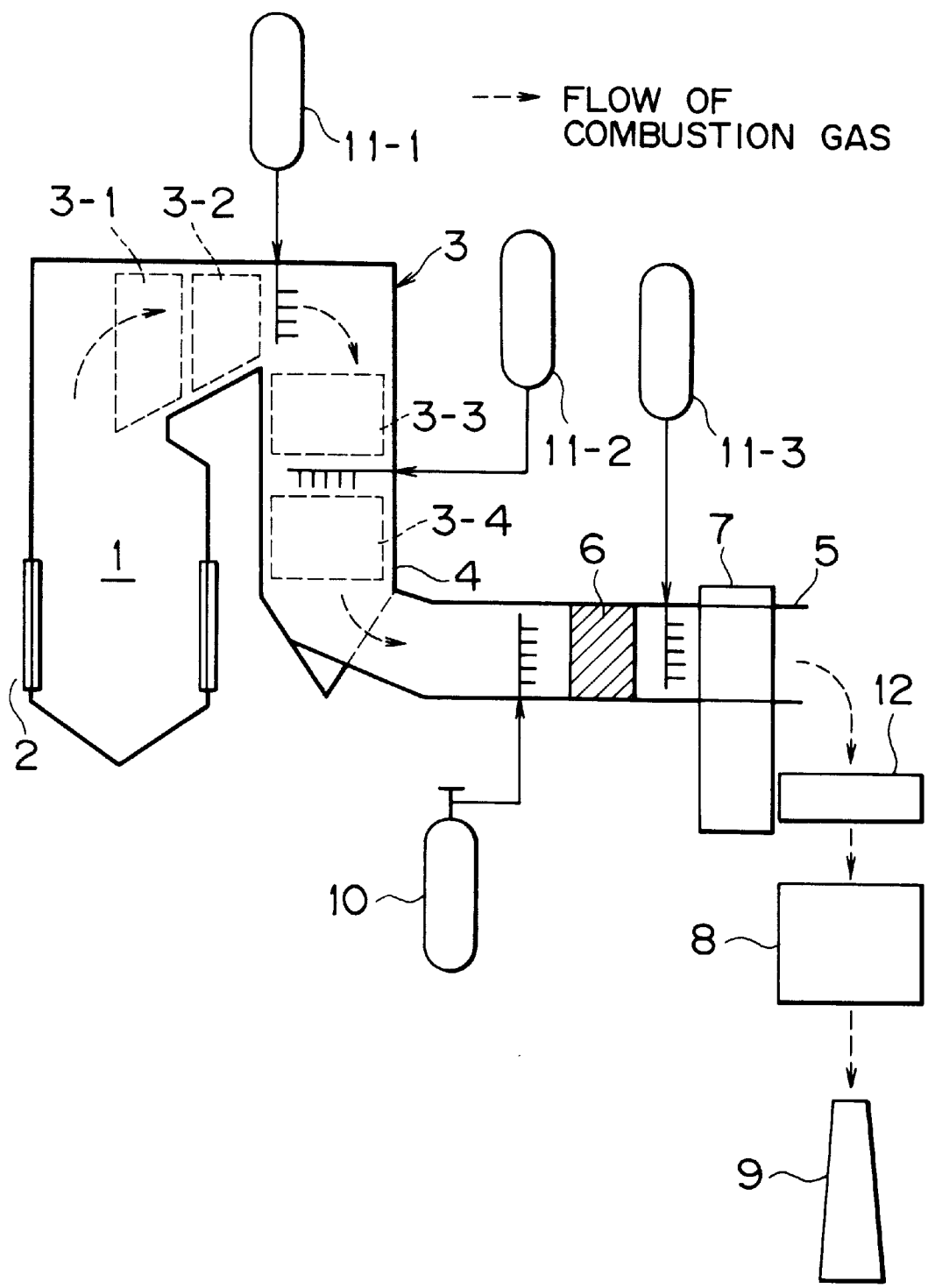
FIG. 5 is a flow diagram showing the flow of combustion exhaust gas in a boiler according to a fifth embodiment of the present invention.

FIG. 5 illustrates a fifth embodiment of the present invention in which a plurality of $SO_3$-decreasing agent feeders are installed at a plurality of positions. In this embodiment, three $SO_3$-decreasing agent feeders A 11-1, B 11-2 and C 11-3 are installed at a position between the outlet of furnace 1 and back pass 4, a position within back pass 4, and a position upstream of air preheater 7 and downstream of nitration catalyst 6, respectively.

According to the method of the present invention, the concentrations of $H_2SO_4$ and $SO_3$ in combustion exhaust gas produced from fuels containing sulfur (S), such as fossil fuels, can be reduced efficiently. This has the following effects from the viewpoint of equipment function and equipment operation, and hence brings about very great economic merits.

(1) The occurrence of troubles (e.g., corrosion and ash deposition) in a flue downstream of the furnace of a boiler or the like and in various apparatus such as a high-temperature heat exchanger and an air preheater can be prevented.

(2) Moreover, since the outlet gas temperature of an air preheater can be lowered owing to a reduction in acid dew-point, the energy efficiency of combustors such as power-generating boilers can be enhanced.

(3) The amount of $NH_3$ injected on the upstream side of an electrostatic precipitator can be decreased. This can decrease the amount of dust produced by the injection of $NH_3$, namely ammonium sulfate $[(NH_4)_2SO_4]$, and hence lessen the load or capacity of the electrostatic precipitator.

(4) Furthermore, trouble with bluish smoke resulting from $H_2SO_4$ and $SO_3$ can be solved.

In order to demonstrate the effects of the present invention, several examples are described below with reference to the accompanying drawings.

EXAMPLE 1

Figure 7A:
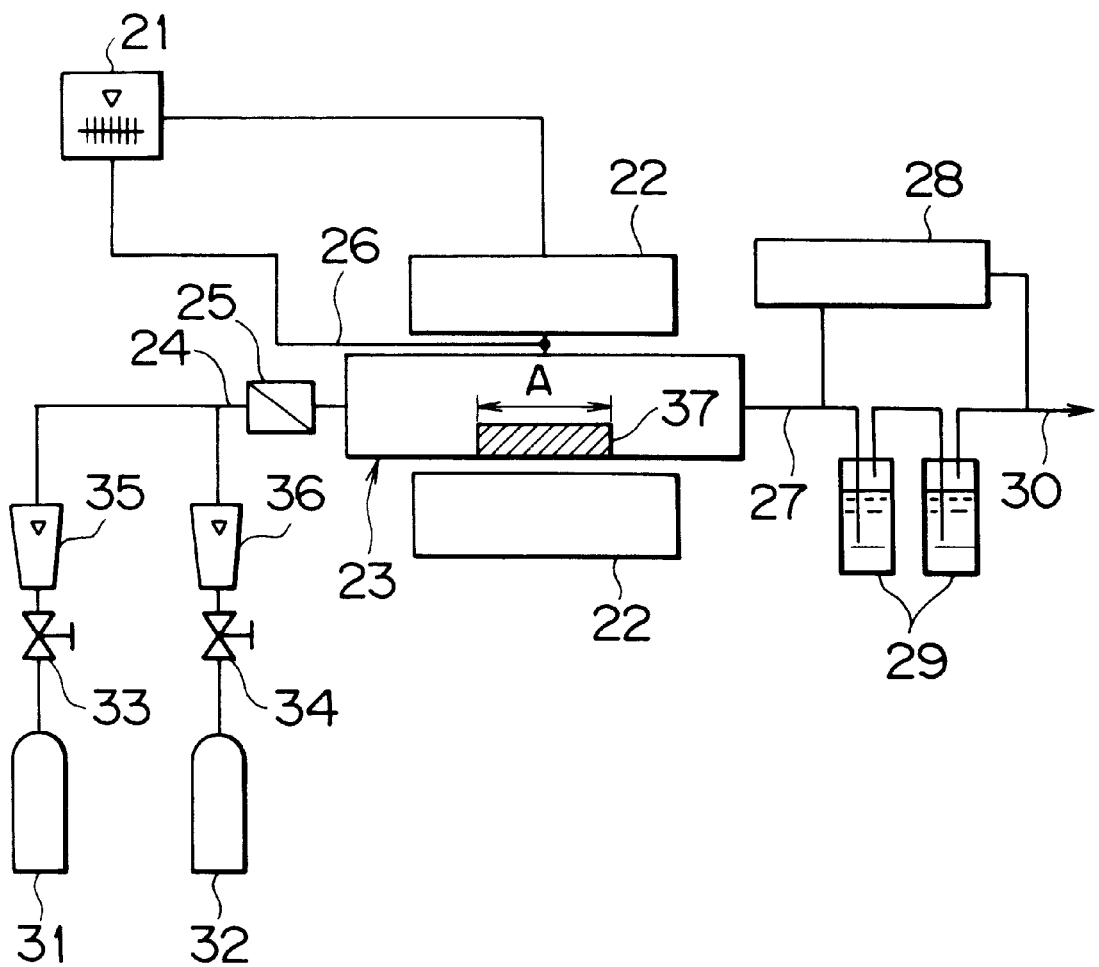
FIG. 7(a) is a flow diagram of an $SO_3$-decreasing reaction test apparatus I (having a single tubular reactor) constructed for the purpose of confirming the effects of the present invention.
Figure 7B:
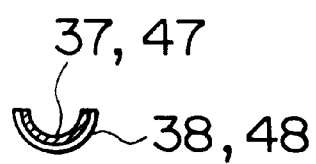
FIG. 7(b) is a cross-sectional view showing the arrangement of test ash within the tubular reactor.

FIG. 7 is a flow diagram of an $SO_3$-decreasing reaction test apparatus I constructed for the purpose of confirming the effects of the present invention. In this apparatus, $H_2$ is used as an $SO_3$-decreasing agent. A test gas is fed from a test gas cylinder 32 through a valve 34 and a flowmeter 36 to a test gas supply line 24, and $H_2$ serving as an $SO_3$-decreasing agent is fed from an $H_2$ additive gas cylinder 31 through a valve 33 and a flowmeter 35 to test gas supply line 24, so that these gases are mixed together. This mixed gas is humidified in a humidifier 25 and then introduced into a tubular reactor 23. The humidification is carried out by bubbling the test gas into warm water having a temperature of 56° C.

Test ash 37 is placed within tubular reactor 23. The temperature of test ash 37 is maintained at a test temperature by means of an electric furnace 22 covering the outer periphery of tubular reactor 23, a temperature controller 21 and a thermocouple 26. In the test gas fed from test gas supply line 24 to tubular reactor 23 by way of humidifier 25, $SO_2$ is converted into $SO_3$ by a catalytic reaction caused by test ash 37 within tubular reactor 23. At the same time, a reaction for decreasing $SO_3$ with the aid of $H_2$ takes place. The test gas containing $SO_3$ produced by the aforesaid reaction is directed to a test gas line 27. A portion of the test gas directed to test gas line 27 is introduced into a gas analyzer 28 where its $SO_3$ concentration is measured. On the other hand, the remainder of the test gas directed to test gas line 27 is subjected to an exhaust gas treatment in gas-absorbing bottles 29, and then discharged into the open air through an exhaust gas line 30.

As test ash 37, there was used Orimulsion ash for testing use (i.e., ash produced by the combustion of an emulsion fuel of Orinoco tar) which had the composition shown in Table 1.

TABLE 1

Results of analysis of Orimulsion ash for testing use

[unit: wt. %]

| as $Na_2O$ | as CaO | as MgO | as $Fe_2O_3$ | as NiO | as $V_2O_5$ | as $SiO_2$ | as $SO_3$ |
|---|---|---|---|---|---|---|---|
| 2.6 | 2.9 | 20.2 | 1.2 | 3.3 | 19.3 | 1.0 | 47.2 |

According to the above-described testing procedure using the $SO_3$-decreasing reaction test apparatus of FIG. 7, $SO_3$-decreasing reaction tests were carried out under the conditions shown in Table 2. The test results thus obtained are shown in FIGS. 9 and 10. FIG. 9 is a graph showing the relationship between the test temperature and the $SO_3$ concentration produced in the test gas when tests were carried out with or without the addition of $H_2$, and FIG. 10 is a graph showing the relationship between the test temperature and the percent decrease in $SO_3$ caused by the addition of $H_2$ as based on the $SO_3$ concentration produced when no $H_2$ was added in the presence of the catalyst (test ash).

It can be seen from FIG. 9 that the addition of $H_2$ is effective in decreasing the $SO_3$ concentration because the $SO_3$ concentration was reduced by the addition of $H_2$ as compared with the case where no $H_2$ was added (in the presence of the catalyst).

Moreover, it is evident from FIG. 10 that the addition of $H_2$ is effective in reducing the degree of conversion of $SO_2$ into $SO_3$ because the percent decrease in $SO_3$ reached a level of about 20 to 80% when the test temperature was in the range of 300 to 1,000° C. and the concentration of $H_2$ added was in the range of 200 to 800 ppm. Thus, it can be seen that, when $H_2$ serving as an $SO_3$-decreasing agent is used in the temperature range of 300 to 1,000° C., the amount of $SO_3$ can be decreased owing to the decreased conversion of $SO_2$ into $SO_3$ and the reduction of the resulting $SO_3$ to $SO_2$. In the results shown in FIG. 10, the percent decrease in $SO_3$ is higher at lower temperatures. The reason for this is considered to be that the amount of $SO_3$ produced is smaller at lower temperatures, resulting in a higher molar $H_2/SO_3$ ratio.

TABLE 2

Testing conditions

| Item | Conditions or specifications |
|---|---|
| Tubular reactor | A quartz tube having an internal diameter of 11.5 mm, a wall thickness of 1.75 mm, and a length of 500 mm |
| Flow rate of test gas | 1.5 Nl/min |
| Test temperature | 300–1,000° C. |
| Gas residence time | 0.53 second (0° C., 1 atm., in the test ash region having a length of 150 mm) |
| Test ash | 0.25 g of Orimulsion ash having the composition shown in Table 1, which was applied to the inside surface of a half quartz tube having an internal diameter of 9 mm, a wall thickness of 1 mm, and a length of 150 mm |
| Analytical method for $SO_3$ | According to JIS K 0103 (using a 90% aqueous solution of isopropyl alcohol as the absorbing fluid) |
| Composition of test gas (at the inlet of reactor) | $SO_2$: 2,000 ppm<br>$CO_2$: 12.0%<br>$O_2$: 2.0%<br>$H_2O$: 16.0%<br>$H_2$: 200–800 ppm<br>Balance: $N_2$ |

Example 2

Figure 8:
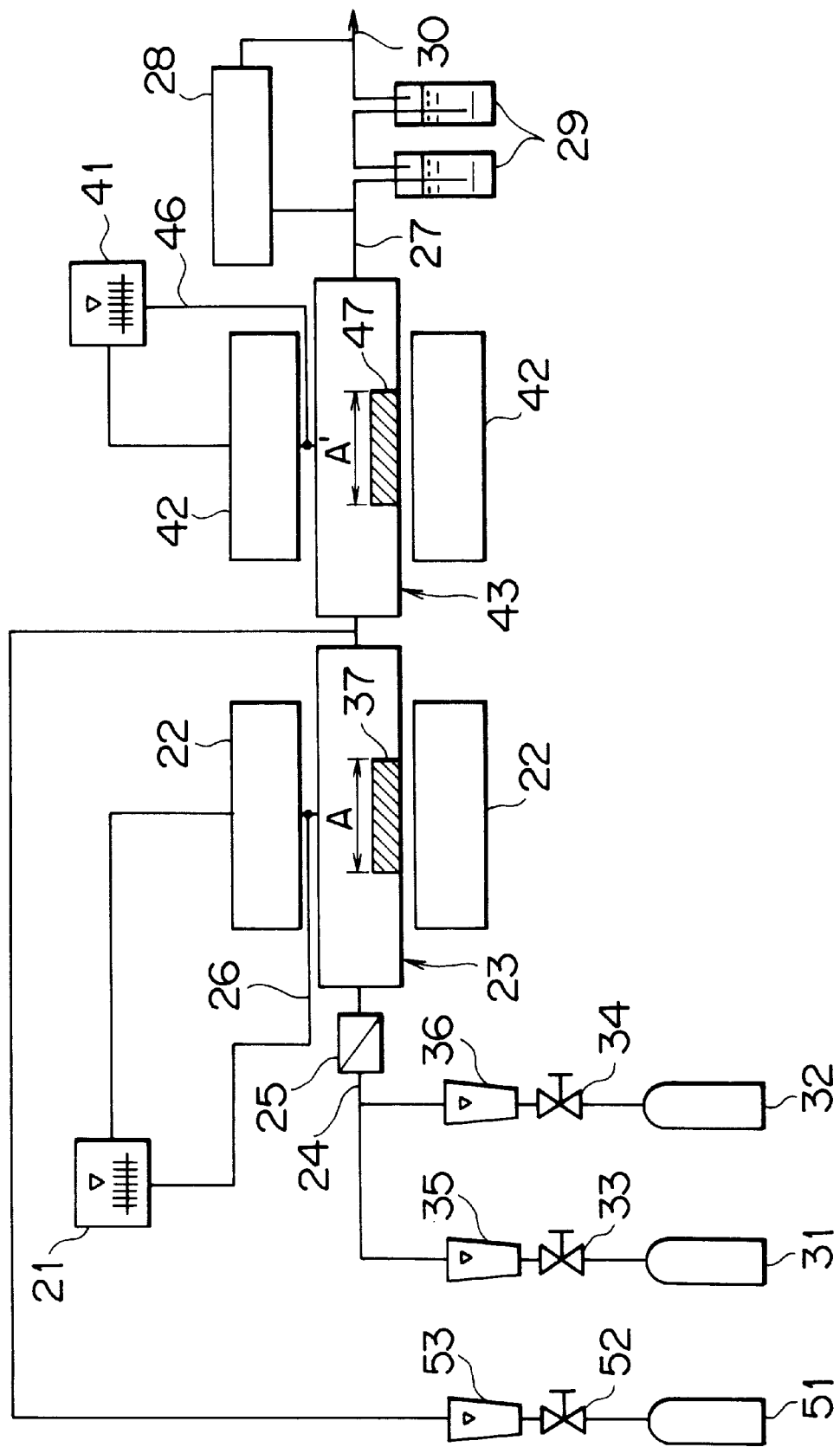
FIG. 8 is a flow diagram of an $SO_3$-decreasing reaction test apparatus II (having two tubular reactors connected in series) constructed for the purpose of confirming the effects of the present invention.

FIG. 8 is a flow diagram of an $SO_3$-decreasing reaction test apparatus II constructed for the purpose of confirming the effects of the present invention. This apparatus has two tubular reactors connected in series, and $H_2$ serving as an $SO_3$-decreasing agent is added to the test gas at the inlet of each tubular reactor. Similarly to the apparatus of FIG. 7, a test gas is fed from a test gas cylinder 32 through a valve 34 and a flowmeter 36 to a test gas supply line 24, and $H_2$ serving as an $SO_3$-decreasing agent is fed from an $H_2$ additive gas cylinder 31 through a valve 33 and a flowmeter 35 to test gas supply line 24, so that these gases are mixed together. This mixed gas is humidified in a humidifier 25 and then introduced into a tubular reactor 23. The humidification is carried out by bubbling the test gas into warm water having a temperature of 56° C. Test ash 37 or 47 is placed within each tubular reactor 23 or 43, respectively. The temperature of test ash 37 or 47 is maintained at a test temperature by means of an electric furnace 22 or 42 covering the outer periphery of tubular reactor 23 or 43, a temperature controller 21 or 41, and a thermocouple 26 or 46.

The test gas fed from test gas supply line 24 to tubular reactor 23 by way of humidifier 25 is then introduced into tubular reactor 43. At a position between tubular reactors 23 and 43, $H_2$ serving as an $SO_3$-decreasing agent is fed from an $H_2$ additive gas cylinder 51 through a valve 52 and a flowmeter 53 and added to the test gas. In the test gas flowing through tubular reactors 23 and 43, $SO_2$ is converted into $SO_3$ by a catalytic reaction caused by test ash 37 and 47 within tubular reactors 23 and 43. At the same time, a reaction for decreasing $SO_3$ with the aid of $H_2$ takes place. The test gas containing $SO_3$ produced by the aforesaid reaction is directed to a test gas line 27. A portion of the test gas directed to test gas line 27 is introduced into a gas analyzer 28 where its $SO_3$ concentration is measured. On the other hand, the remainder of the test gas directed to test gas line 27 is subjected to an exhaust gas treatment in gas-absorbing bottles 29, and then discharged into the open air through an exhaust gas line 30.

As test ash 37 and 47, there was used Orimulsion ash for testing use which was the same as used in Example 1 and had the composition shown in Table 1.

Using the $SO_3$-decreasing reaction test apparatus of FIG. 8, $SO_3$-decreasing reaction tests were carried out by adding $H_2$ to tubular reactor 23 alone or by adding $H_2$ to both tubular reactors 23 and 43. The test results thus obtained are shown in Table 3. The test temperature was 700° C. for tubular reactor 23 and 350° C. for tubular reactor 43.

As can be seen from Table 3, the $SO_3$ concentration at the outlet of tubular reactor 43 was 98 ppm when no $H_2$ was added, and the $SO_3$ concentration at the outlet of tubular reactor 43 was 46 ppm when 800 ppm of $H_2$ was added to the test gas at a position before tubular reactor 23. In this situation, 400 ppm of $H_2$ was further added to the test gas at a position before tubular reactor 43, so that the $SO_3$ concentration at the outlet of tubular reactor 43 was reduced to 19 ppm. However, when 1,200 ppm (=800 ppm+400 ppm) of $H_2$ was added to the test gas at a position before tubular reactor 23, the $SO_3$ concentration at the outlet of tubular reactor 43 was 41 ppm.

It can be seen from these results that, when $H_2$ is divided into a plurality of portions and they are added at different positions, the $SO_3$-decreasing effect is further enhanced as compared with the case where the same amount of $H_2$ is added at one position.

TABLE 3

Results of $SO_3$-decreasing tests

| Tubular reactor 23 Test temperature: 700° C. | | Tubular reactor 43 Test temperature: 350° C. | | $SO_3$ concentration at the outlet of tubular reactor 43 (ppm) | Percent decrease in $SO_3$ at the outlet of tubular reactor 43 (%) |
|---|---|---|---|---|---|
| Amount of $H_2$ added (ppm) | Molar $H_2/SO_3$ ratio | Amount of $H_2$ added (ppm) | Molar $H_2/SO_3$ ratio | | |
| 0.0 | — | 0.0 | — | 98.0 | 0.0 |
| 400 | 8.2 | 0.0 | — | 46.0 | 53.0 |
| 800 | 8.2 | 400 | 8.7 | 19.0 | 81.0 |
| 1200 | 12.2 | 0.0 | — | 41.0 | 58.0 |

What is claimed is:

1. A method for decreasing sulfuric acid and sulfuric anhydride present in combustion exhaust gas which comprises adding an $SO_3$-decreasing agent to combustion exhaust gas and thereby reducing sulfuric acid and sulfuric anhydride present in the combustion exhaust gas, wherein the $SO_3$-decreasing agent is hydrogen gas ($H_2$) and is added at one or more positions in a region which lies downstream of a combustor and in which the temperature of the combustion exhaust gas is in the range of 300° C. to 1,000° C.

* * * * *